(12) United States Patent
Jung et al.

(10) Patent No.: US 7,978,764 B2
(45) Date of Patent: Jul. 12, 2011

(54) METHOD OF VIDEO ENCODING FOR HANDHELD APPARATUSES SELECTING BEST PREDICTION FUNCTION ACCORDING TO OPTIMAL RATE-DISTORTION VALUE

(75) Inventors: Jôel Jung, Le Mesnil St Denis (FR); Arnaud Bourge, Paris (FR)

(73) Assignee: NXP B.V., Eindhoven (NL)

( * ) Notice: Subject to any disclaimer, the term of this patent is extended or adjusted under 35 U.S.C. 154(b) by 1260 days.

(21) Appl. No.: 10/562,288

(22) PCT Filed: Jun. 22, 2004

(86) PCT No.: PCT/IB2004/002109
§ 371 (c)(1),
(2), (4) Date: Dec. 22, 2005

(87) PCT Pub. No.: WO2005/002233
PCT Pub. Date: Jan. 6, 2005

(65) Prior Publication Data
US 2006/0209953 A1    Sep. 21, 2006

(30) Foreign Application Priority Data
Jun. 27, 2003    (EP) .................................... 03300041

(51) Int. Cl.
*H04N 7/32*    (2006.01)
*H04N 7/50*    (2006.01)
(52) U.S. Cl. ......... 375/240.02; 375/240.12; 375/240.14; 375/240.27
(58) Field of Classification Search ............ 375/240.02, 375/240.12, 240.14, 240.16, 240.18, 240.24, 375/240.26, 240.27; 382/238, 236, 239, 382/248
See application file for complete search history.

(56) References Cited

U.S. PATENT DOCUMENTS

| | | | |
|---|---|---|---|
| 5,818,536 A | 10/1998 | Morris et al. | |
| 6,028,631 A | 2/2000 | Nakaya et al. | |
| 6,037,987 A | 3/2000 | Sethuraman | |
| 6,167,162 A | 12/2000 | Jacquin et al. | |
| 7,330,595 B2 * | 2/2008 | Park et al. .................... | 382/236 |

(Continued)

FOREIGN PATENT DOCUMENTS

CN    1 212 578 A    3/1999

(Continued)

OTHER PUBLICATIONS

Lu, X. et al. "Power Efficient H.263 Video Transmission Over Wireless Channels", Proc. 2002 IEEE Int'l. Conf. on Image Processing, vol. 2 of 3, pp. 533-36 (Sep. 2002).
Schwarz, H. et al. "Lagrangian Coder Control and Comparison of MPEG-4 and H-26L Video Codecs", ITG Fachberichte, VDE Verlag, No. 170, pp. 301-08 (Jan. 2002).

(Continued)

*Primary Examiner* — Scott A Rogers

(57) ABSTRACT

The present invention relates to a method of encoding a sequence of pictures, a picture being divided into blocks of data, said encoding method comprising the steps of:—computing a residual error block from a difference between a current block contained in a current picture and a candidate area using of a prediction function,—computing an entropy of the residual error block,—computing an overall error between said current block and said candidate area,—estimating a power consumption of a video processing device adapted to implement said prediction function,—computing a rate-distortion value on the basis of the entropy, the overall error and the estimated power consumption of the video processing device,—applying the preceding steps to a set of candidate areas using a set of prediction functions in order to select a prediction function according to the rate-distortion value.

9 Claims, 3 Drawing Sheets

U.S. PATENT DOCUMENTS

| | | | | |
|---|---|---|---|---|
| 7,471,724 B2 * | 12/2008 | Lee | ............................ | 375/240.12 |
| 2005/0105616 A1 * | 5/2005 | Kim et al. | ................. | 375/240.12 |
| 2006/0171454 A1 * | 8/2006 | Jung | ......................... | 375/240.12 |
| 2007/0230919 A1 * | 10/2007 | Bourge et al. | .................. | 386/109 |
| 2007/0274385 A1 * | 11/2007 | He | ............................ | 375/240.12 |

FOREIGN PATENT DOCUMENTS

| | | |
|---|---|---|
| EP | 1 170 948 A2 | 1/2002 |
| WO | 02/096 120 A1 | 11/2002 |

OTHER PUBLICATIONS

Sullivan, G. et al. "Rate-Distortion Optimization for Video Compression", IEEE Signal Processing Magazine, vol. 15, No. 6, pp. 74-90 (Nov. 1998).

Chaddha, N. et al. "A Low Power Video Encoder With Power, Memory and Bandwidth Scalability", Proc. IEEE 9th Int'l. Conf. on VLSI Design, pp. 358-63 (Jan. 1996).

Written Opinion in Int'l. Patent Appln. No. PCT/IB2004/002109.

* cited by examiner

METHOD OF VIDEO ENCODING FOR HANDHELD APPARATUSES SELECTING BEST PREDICTION FUNCTION ACCORDING TO OPTIMAL RATE-DISTORTION VALUE

FIELD OF THE INVENTION

The present invention relates to a method of encoding a sequence of pictures, a picture being divided into blocks of data, said method being based on a predictive block-based encoding technique.

This invention is particularly relevant for products embedding a digital video encoder such as, for example, home servers, digital video recorders, camcorders, and more particularly mobile phones or personal digital assistants, said apparatus comprising an embedded camera able to acquire and to encode video data before sending it.

BACKGROUND OF THE INVENTION

In a conventional video encoder, most of the memory transfers and, as a consequence, a large part of the power consumption, come from motion estimation. Motion estimation consists in searching for the best match between a current block and a set of several candidate reference blocks according to a rate distortion criterion, a difference between the current block and a candidate reference block forming a residual error block.

The paper entitled "Rate Distortion Optimization for Video Compression", by G. Sullivan, T. Wiegand, IEEE Signal Processing Magazine, pp. 74-90, November 1998 describes a method of computing a rate-distortion value. This value c is computed from an entropy h of the residual error block and on a reconstruction error mse derived from said residual error block, as given by equation (1):

$$c = h + \lambda_1 * mse \quad (1)$$

where $\lambda_1$ is a weighting coefficient.

This helps for selecting the best mode to encode the current block according to an expected bit-rate. The best reference block that is selected is the one that minimizes the rate-distortion value. Then the residual error block is entropy coded and transmitted with its associated motion vector and/or encoding mode.

But such a rate-distortion value is not optimal, especially in the case of a video encoder embedded in a portable apparatus having limited power.

SUMMARY OF THE INVENTION

It is an object of the invention to propose an encoding method, which allows the power consumption of a video processing device, i.e. a video decoder or a video encoder, to be reduced.

To this end, the video encoding method in accordance with the invention is characterized in that it comprises the steps of:
  computing a residual error block from a difference between a current block contained in a current picture and a candidate area using a prediction function,
  computing an entropy of the residual error block,
  computing an overall error between said current block and said candidate area,
  estimating a power consumption of a video processing device adapted to implement said prediction function,
  computing a rate-distortion value on the basis of the entropy, the overall error and the estimated power consumption of the video processing device,
  applying the preceding steps to a set of candidate areas using a set of prediction functions in order to select a prediction function according to the rate-distortion value.

As a consequence, the invention is able to select, at the encoding stage, the prediction function, i.e. the best encoding mode, from among all available ones thanks to a new rate-distortion value taking into account the power consumption of the prediction process. In other words, the classical rate-distortion value receives an estimation of the power consumption as a third dimension, to become a power-rate-distortion value, allowing a better tradeoff between power consumption, bit-rate or bandwidth, and visual quality.

According to a first embodiment of the invention, the rate-distortion value takes into account an estimated power consumption of the prediction functions by a video decoder for decoding the corresponding encoded sequence of pictures, by favoring power-friendly prediction functions.

According to another embodiment of the invention, the rate-distortion value takes into account the power consumption required by the video encoder in order to perform the prediction.

The present invention also relates to a video encoder implementing said video encoding method.

It relates to a handheld apparatus comprising said video encoder and a power supply for supplying said video encoder.

It finally relates to a computer program product comprising program instructions for implementing, when said program is executed by a processor, the video encoding method in accordance with the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for adapting the encoding process, and more especially the prediction step, as a function of the power consumption of a video encoder and/or decoder. The encoding process is adapted to take into account, for example, the battery level of said encoder and/or decoder.

Said method is more especially dedicated to handheld devices, such as mobile phones or embedded cameras, which have limited power, and that have to deal with the encoding and decoding of video sequences.

It can be used within MPEG-4 or H.264 video encoder, or any equivalent rate-distortion-based video encoder. The method can be extended to audio, and still images encoding/decoding.

The present invention is based on the following considerations. Let us consider a conventional video architecture comprising a central processing unit CPU, coupled with a dedicated co-processor, and an external memory module. For years, the central processing unit CPU has been considered as the greediest of these three elements in terms of power consumption, implying that the computational complexity of an algorithm also determined its energy consumption. Now, the repartition is more balanced between the computational load and the memory accesses. And given the current evolution, a predominance of the latter can be foreseen soon. Consequently, having such architecture in mind, low-power applications require a significant reduction of memory accesses compared to current algorithms. Furthermore, the locality of these accesses is important too, because a memory module closer to the CPU means less energy dissipation when accessing data.

Figure 1:
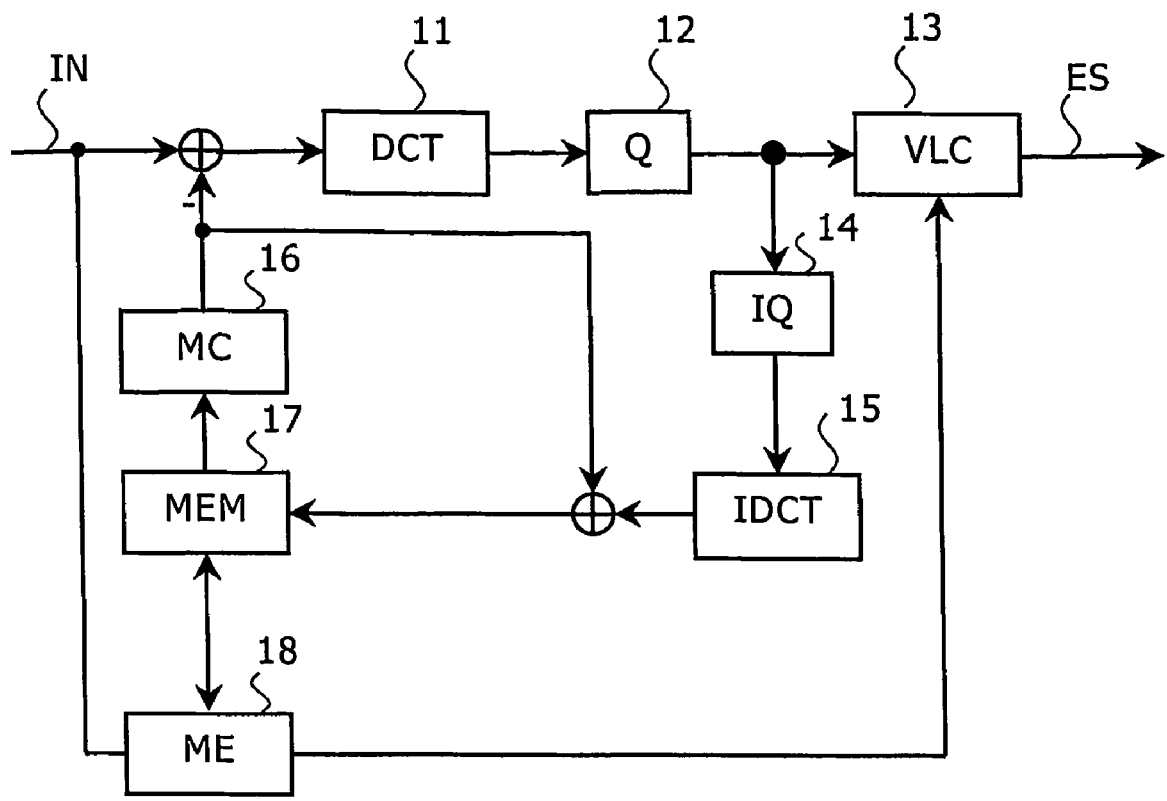
FIG. 1 is a block diagram of a conventional video encoder.

In the case of a conventional video encoder as depicted in FIG. 1, the above-described elements are adapted to perform Discrete Cosine Transformation DCT (11), scalar quantization Q (12), variable length coding VLC (13), inverse quantization IQ (14), Inverse Discrete Cosine Transformation IDCT (15), motion compensation MC (16) and motion estimation ME (18). The motion compensation and motion estimation modules are coupled to the external frame memory module MEM (17).

Figure 2:
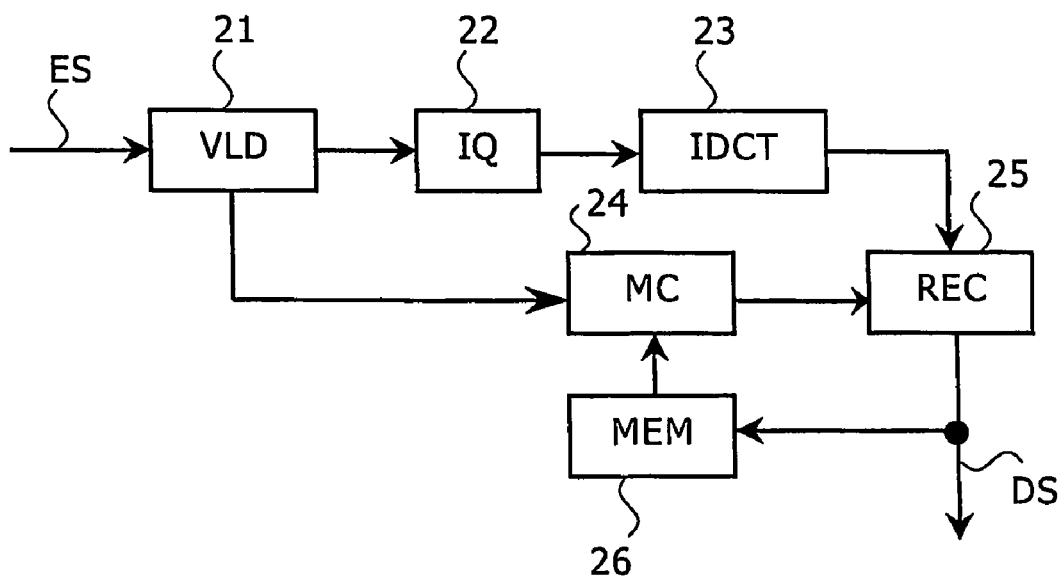
FIG. 2 is a block diagram of a conventional video decoder.

In the case of a conventional video encoder as depicted in FIG. 2, the above-described elements are adapted to perform variable length coding VLD (21), inverse quantization IQ (22), Inverse Discrete Cosine Transformation IDCT (22), motion compensation MC (24) and block reconstruction REC (25). The motion compensation module is coupled to the external frame memory module MEM (26).

The bottleneck in terms of power consumption is the amount of transfers between the different units of these video architectures. The present invention is based on the observation that most of the memory transfers come from motion estimation and motion compensation. These motion operations represent many accesses to pixels, and so to the external memory module. The larger the search range, the larger the size of the memory and consequently the power dissipation.

According to the present invention, the objective is to select, at the encoding stage, the best prediction function among available ones, by also taking into account the power consumption of the prediction process. The present invention proposes three different cases in which the use of a new rate-distortion criterion can increase the overall power-consumption/bit-rate/visual quality tradeoff, either at the decoder level, or at the encoder level, or for both.

Figure 3:
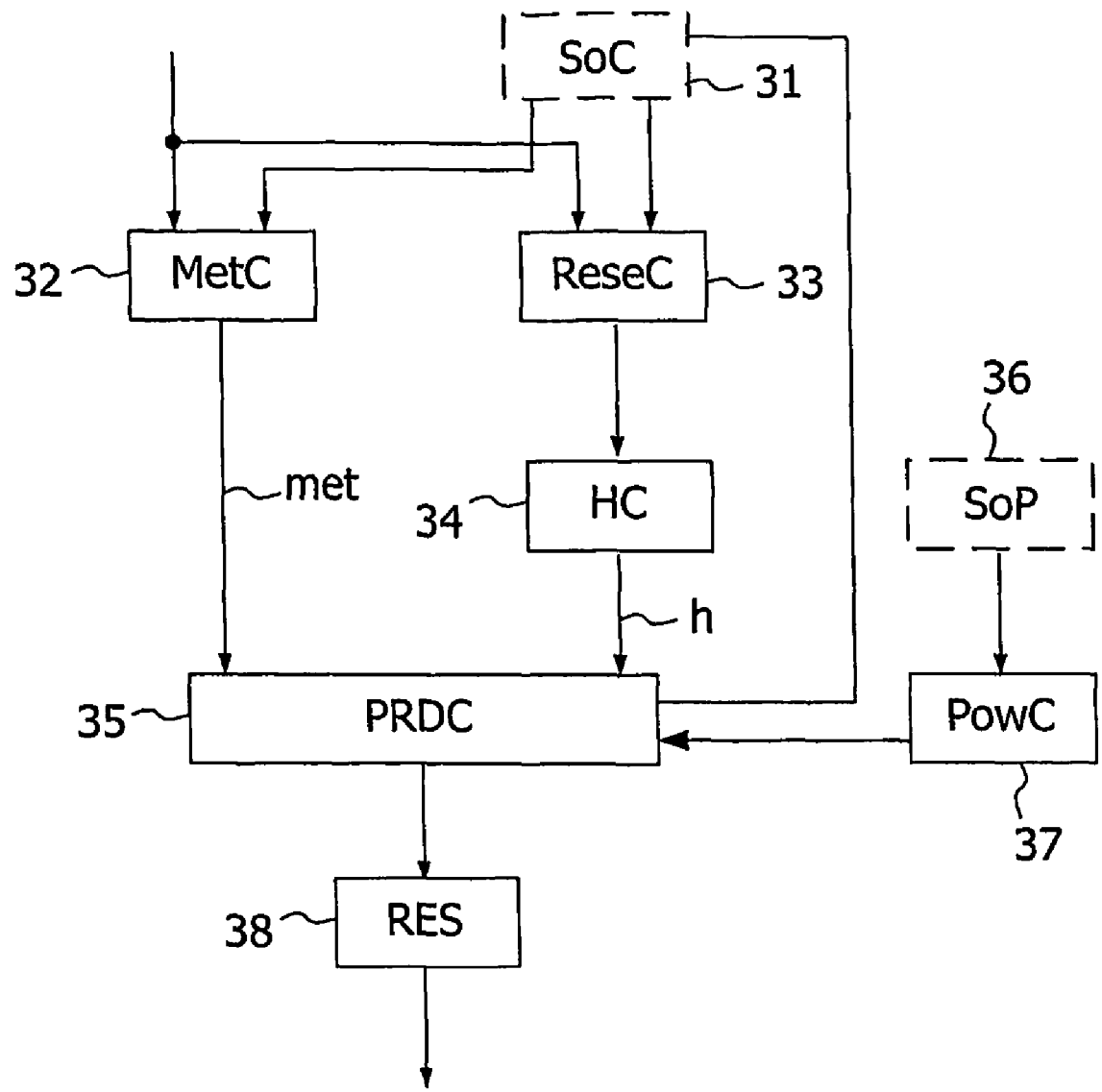
FIG. 3 is a block diagram showing the encoding method in accordance with the invention.

FIG. 3 is a block diagram showing the encoding method in accordance with the invention. Said method is able to encode a sequence of pictures, a picture being divided into locks of data.

It comprises a first step ReseC (33) of computing a residual error block from a difference between a current block contained in a current picture and one candidate area thanks to the use of a prediction function.

The prediction function is chosen among a set of prediction functions. A prediction function is defined as a way to predict, in a current frame, a current block, i.e. the one that is intended to be encoded, based on pixels from other areas, located either in the same frame, or in a previous or future frame.

A prediction function of the set is, for example, based on conventional motion estimation. Said conventional motion estimation consists in searching for a candidate reference block within in a reference picture, i.e. a past or future picture, said block corresponding to a current block contained in a current picture. Said candidate reference block, i.e. the candidate area, is searched within a predetermined area of the reference picture called the search area. In the example of the MPEG2 standard, the search area is limited to 256 lines for decoding. It will be apparent to a person skilled in the art that the size of the search area can be reduced depending on the computational resources.

Figure 4:
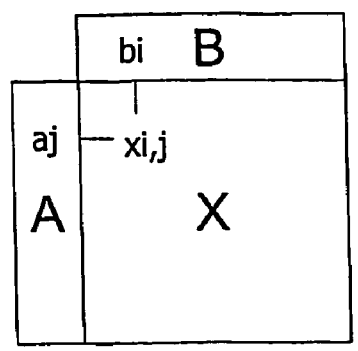
FIG. 4 represents a current block and its neighborhood, from which spatial prediction functions are computed.

Another prediction function pf1 is based on H.264 Intra Prediction. For a given pixel $x(i,j)$ in a current block X to encode, a residual value $r(i,j)$ is computed from the left-adjacent column A and the top-adjacent line B of the block X, as described in FIG. 4, A and B forming in this example the candidate area. The residual value $r(i,j)$ is computed as follows:

$$r(i,j)=x(i,j)-avg(A,B),$$

where $avg(A,B)$ is a function able to compute the average value of the segments A and B. This first prediction function is particularly adapted to homogeneous areas.

Another prediction function pf2 is based on H.264 Intra Vertical Prediction. With the notations given in FIG. 4, the residual value is computed as follows:

$$r(i,j)=x(i,j)-b(i).$$

This spatial prediction function is particularly adapted to vertically homogeneous areas.

Another prediction function pf3 is based on H.264 Intra Horizontal Prediction. With the notations given in FIG. 4, the residual value is computed as follows:

$$r(i,j)=x(i,j)-a(j).$$

This spatial prediction function is particularly adapted to horizontally homogeneous areas. Several other spatial predictions are also possible. They have in common to only use A and B segments, or to apply invertible functions on X, in order to be decodable.

Figure 5:
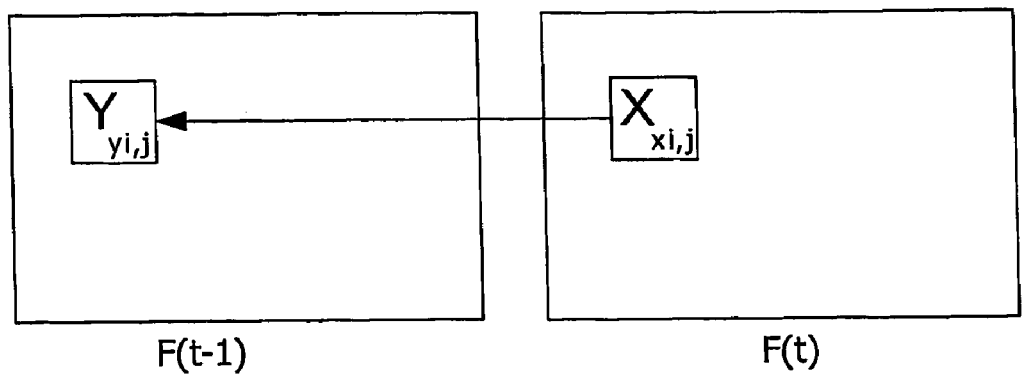
FIG. 5 represents two blocks in two successive frames, from which a temporal prediction function is computed.

Another prediction function pf4 is based on FIG. 5 representing a block X of pixels $x(i,j)$ in a current frame $F(t)$ and a corresponding block Y of pixels $y(i,j)$ having the same position in the immediately past frame $F(t-1)$, the block Y forming in this case the candidate area. This function is called "Collocated Temporal Prediction". With the notations given in FIG. 5, the residual value is computed as follows:

$$r(i,j)=x(i,j)-y(i,j).$$

This temporal prediction function is particularly adapted to static areas.

An extension of this prediction function called "Collocated Restricted Motion Estimation" and for which motion estimation is performed within the collocated block only can also be used.

Figure 6:
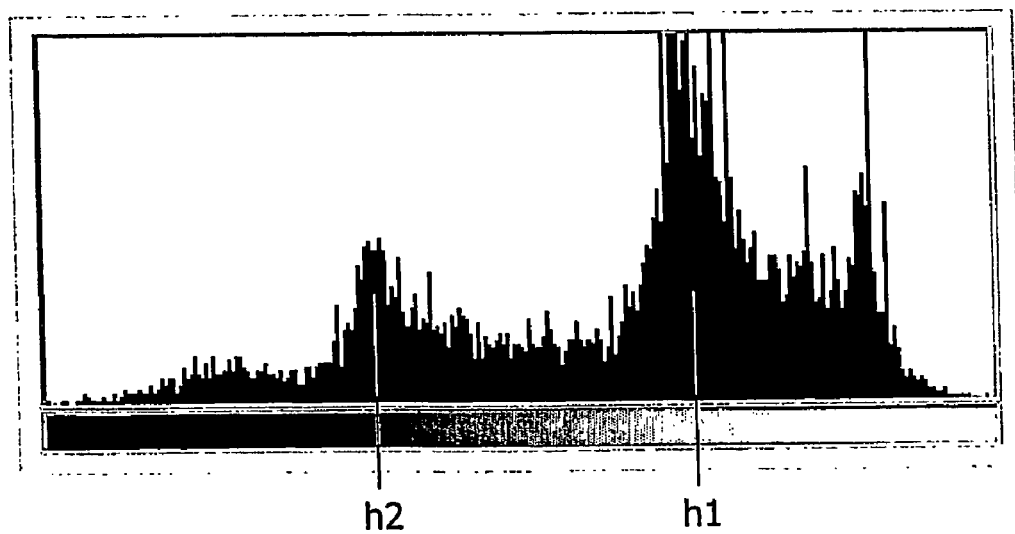
FIG. 6 represents a histogram of a block in a past frame, from which a temporal prediction function is computed for a current collocated block.

Another prediction function pf5, called "Temporal Histogram Prediction", uses a histogram of the collocated block in the previous frame. If, for example, h1 and h2 are two maximums of the histogram, as given in FIG. 6, the residual value is computed as follows:

$$r(i,j)=x(i,j)-h1 \text{ or } r(i,j)=x(i,j)-h2,$$

depending on the proximity of the value $x(i,j)$ with the values h1 and h2. For that purpose, one bit is transmitted to inform the decoder of this choice. This temporal prediction function is also adapted to static areas.

The present invention is based on the fact that these different prediction functions have different power consumptions. For example temporal prediction functions are more power consuming than spatial prediction functions, as they require many accesses to the external memory module containing reference frames.

It is to be noted that these prediction functions are depicted as an example and that other prediction functions can be used without departing from the scope of the invention. It is also to be noted that the concurrent prediction functions can be applied to data blocks having different size, such as for example 16×16, 16×8, 8×16, 8×8, 8×4, 4×8 or 4×4 pixels.

The encoding method comprises a second step HC (34) of computing an entropy h of the residual error block. Said step is able to determine the minimal number of bits necessary for the entropy coding of the residual error block. The entropy h is computed according to a principle known to a person skilled in the art, using the following formula:

$$h - \sum_{i=0}^{I} p_i \log(p_i)$$

where $p_i$ is the probability of a data value to be present in a block of pixels and I is typically equal to 255 if pixel values are 8-bit values.

The encoding method comprises a third step MetC (32) of computing an overall error between the current block and the candidate area.

The step of computing an overall error is based, for example, on the computing of the mean square error MSE, the expression of the MSE being:

$$MSE = \frac{1}{kl} \sum_{i=0}^{k-1} \sum_{j=0}^{l-1} |r(i,j)|^2$$

where k×l is the size of the current block.

The computing step is based, as another example, on the computing of the mean absolute error MAE, the expression of the MAE being:

$$MAE = \frac{1}{kl} \sum_{i=0}^{k-1} \sum_{j=0}^{l-1} |r(i,j)|.$$

It will be apparent to a person skilled in the art that the overall error can be computed by using other different functions based on values of the current block and values of the candidate area.

The encoding method comprises a fourth step PowC (37) of estimating a power consumption of a video processing device, i.e. a video encoder or decoder, adapted to implement the prediction function. The estimation is performed as a function of the following parameters.

The estimation step is able to estimate the power consumption of the video processing device from a set of parameters SoP (36). These power consumption parameters are of course the characteristics of the prediction functions, that is to say the computational and transfer parameters of the prediction function. The computational parameters are for example:
- the amount of operations (addition, multiplication, etc)
- the amount of conditional jumps and basic functions, such as computing of absolute values, minimum values, maximum values, etc.

The transfer parameters are for example:
- the memory requirements (type, size, etc),
- the amount of memory transfers.

These power consumption parameters are optionally platform information, that is to say technical characteristics of the video processing device. These technical characteristics are for example:
- the characteristics of the processor, notably its working frequency,
- the size of cache memory,
- the size of embedded memory,
- the size of external memory,
- the power consumption for basic operations (gates),
- the power consumption for the exchange between the different memories and the processor.

These power consumption parameters are optionally power supply information, such as, for example, the current battery level of the video processing device.

Power consumption evaluation is a tricky problem. An accurate measure is obtained only if the chip exists. However, measurements based on software are possible, at the price of a lower accuracy.

The present invention is able to compute the power consumption of the critical parts of the algorithm, as a function of the number of memory accesses, the locality of the memory, and the computational cost, with relative weights as given below:

| Add, Shift, Branch, Move | Multiplication | Division | Load Store (Register) | Load, Store (Internal Memory) | Load, Store (External Memory) |
|---|---|---|---|---|---|
| 1 | 3 | 16 | 1 | 50 | 500 |

These weights have been determined assuming a standard architecture (CPU+memory+co-processor), as it will stand in the next few years, that is to say with a high payload for memory accesses, compared to the one for computations.

The encoding method comprises a fifth step PRDC (35) of computing a rate-distortion value on the basis of the entropy of the residual error block, the overall error and the estimated power consumption of the video processing device.

According to a first embodiment of the invention, the estimation step is able to estimate the power consumption of a video decoder for the prediction functions of the set.

The power-rate-distortion value is then used at the encoder level, in order to reduce the power consumption of the decoder by favoring power-friendly prediction functions.

The distortion value depends as usual on the entropy h of the residual data, and on the reconstruction error "ove" between the current block and the candidate area. The power consumption required to decode the current prediction function is also taken into account, to increase the overall power-distortion/bit-rate tradeoff at the decoder side. A significant power gain can thus compensate a slight encoding efficiency loss. The distortion value c in accordance with the invention is computed as given below:

$$c = h + \lambda_1 * ove + \lambda_2 * \text{power}_{decoder}(\text{parameters}) \qquad (2)$$

where $\lambda_1$ and $\lambda_2$ are weighting factors, $\text{power}_{decoder}()$ represents the power consumption required at the decoder to perform the prediction and parameters are the elements that permit the estimation of the power consumption. These parameters have been described above.

Depending on the type and protocol of communication, more or less information about the decoder is available for the encoder. In equation (2) the result of the power estimation can come from the weighting of the prediction function characteristics by the platform information. The availability of these parameters makes the decoding power estimation more or less precise.

According to a variant of this first embodiment, the receiving device is able to send during the initialization of a communication between an emitting device and said receiving device, its major power consumption characteristics, above-referred to as platform information, which could be used directly by the encoder of the emitting device to estimate the power consumption of the decoder of the receiving device more accurately in equation (2).

Alternatively, if this information is not available, the encoder is able make the assumption of a standard decoding platform, for example with a standard ARM9 processor, with a predetermined amount of embedded RAM, and external memory, and usual transfer costs.

Besides, if the receiving device is able to sent at regular moments its battery level to the emitting/encoding device, the latter can act directly on $\lambda_2$, to increase or decrease the importance of the power used by the decoder. For example, if the battery level decreases, $\lambda_2$ is increased in order to reinforce the importance of the power consumption value on the choice the prediction function. As a consequence, high consuming prediction functions are penalized.

According to a second embodiment of the invention, the estimation step is able to estimate the power consumption of a video encoder for a prediction function of the set.

At the encoder, if all the concurrent prediction functions are computed, it is not possible to save the encoding power consumption. However, a selection of the number of evaluated prediction functions allows the power consumption of the encoder level to be reduced.

According to the invention, the selection depends on a power-rate-distortion value calculated through a learning stage. This learning stage consists in testing a few pictures with all the prediction functions. The tested pictures can be the first pictures of a sequence of pictures or some pictures just after a scene cut. Indeed, between two scene cuts, it is assumed that a given sequence has stable temporal and spatial characteristics. A learning stage can consequently select the most appropriate prediction functions, in order to avoid testing systematically all the prediction functions available at the encoder. This selection is based on the proposed power-rate-distortion value as given below:

$$c=h+\lambda_1*mse+\lambda_3*\text{power}_{encoder}(\text{parameters}) \quad (3)$$

where $\lambda_3$ is a weighting factor playing the same role as $\lambda_2$ and $\text{power}_{encoder}(\ )$ represents the power consumption required at the encoder to perform the prediction. The parameters are the ones described above. Platform information are of course available, and the battery level is required only if power scalability needs to be applied.

It is possible to merge both approaches, as proposed in equation (4). In this case, encoder and decoder devices are working hand in hand to optimize the end-to-end power-quality tradeoff.

$$c=h+\lambda_2*mse+\lambda_2*\text{power}_{decoder}(\text{parameters})+ \lambda_3*\text{power}_{encoder}(\text{parameters}) \quad (4)$$

For example if a mobile phone having a high battery level is encoding a sequence of pictures and is transmitting the encoded sequence to a second mobile phone having a low battery level. As a consequence, the decoder of the second mobile phone requires low power consuming prediction functions. In this case the weighting factor $\lambda_2$ is high and the weighting factor $\lambda_3$ is low. Everything is done to penalize high power consuming prediction functions and then to take into account the low battery level of the second mobile phone.

The encoding method comprises a sixth step of applying the preceding steps to a set of candidate areas SoC (31) using of a set of prediction functions in order to select a best prediction function and a corresponding best candidate area from the power-rate-distortion value. To this end, the distortion values of the evaluated prediction functions are stored into a memory RES (38) and the best prediction, i.e. the one that minimizes the power-rate-distortion value, is selected for encoding the current block.

Any reference sign in the following claims should not be construed as limiting the claim. It will be obvious that the use of the verb "to comprise" and its conjugations do not exclude the presence of any other steps or elements besides those defined in any claim. The word "a" or "an" preceding an element or step does not exclude the presence of a plurality of such elements or steps.

The invention claimed is:

1. A method of encoding a sequence of pictures, a picture being divided into blocks of data, said encoding method comprising the steps of:

computing a residual error block from a difference between a current block contained in a current picture and a candidate area using a prediction function, computing an entropy of the residual error block, computing an overall error between said current block and said candidate area, estimating a power consumption of a video processing device adapted to implement said prediction function, computing a rate-distortion value on the basis of the entropy, the overall error and the estimated power consumption of the video processing device, applying the preceding steps to a set of candidate areas using a set of prediction functions in order to select a prediction function according to the rate-distortion value.

2. A video encoding method as claimed in claim 1, wherein the estimation step is able to use the power consumption of a video decoder for a prediction function of the set.

3. A video encoding method as claimed in claim 1, wherein the estimation step is able to compute, for a given number of pictures, the power-rate-distortion value of the different prediction functions of the set and to select, for the encoding of following pictures, the prediction functions that minimize the power-rate-distortion value.

4. A video encoding method as claimed in claim 1, wherein the estimation step is able to estimate the power consumption of the video processing device from computational and transfer parameters of the prediction functions.

5. A video encoding method as claimed in claim 4, wherein the estimation step is able to estimate the power consumption of the video processing device from technical characteristics of the video processing device.

6. A video encoding method as claimed in claim 1, wherein the rate-distortion value depends on a product of the estimated power consumption and a weighting factor, said weighting factor being dependent on a power supply level of the video processing device.

7. A video encoder for encoding a sequence of pictures, a picture being divided into blocks of data, said video encoder comprising means for implementing the steps of the video encoding method as claimed in claim 1.

8. A handheld apparatus comprising a video encoder as claimed in claim 7, and a power supply for supplying said video encoder.

9. A computer program product comprising program instructions for implementing, when said program is executed by a processor, a video encoding method as claimed in a claim 1.

* * * * *